(12) United States Patent
Laubscher

(10) Patent No.: US 11,247,901 B2
(45) Date of Patent: Feb. 15, 2022

(54) FREE ATOM NANOTUBE GROWTH

(71) Applicant: Odysseus Technologies, Inc., Olympia, WA (US)

(72) Inventor: Bryan Edward Laubscher, Olympia, WA (US)

(73) Assignee: Odysseus Technologies, Inc., Olympia, WA (US)

( * ) Notice: Subject to any disclaimer, the term of this patent is extended or adjusted under 35 U.S.C. 154(b) by 0 days.

(21) Appl. No.: 16/802,384

(22) Filed: Feb. 26, 2020

(65) Prior Publication Data

US 2020/0189912 A1    Jun. 18, 2020

Related U.S. Application Data

(60) Division of application No. 15/043,952, filed on Feb. 15, 2016, now Pat. No. 10,618,810, which is a
(Continued)

(51) Int. Cl.
*C01B 21/064* (2006.01)
*C01B 21/072* (2006.01)
(Continued)

(52) U.S. Cl.
CPC .......... *C01B 21/064* (2013.01); *C01B 21/072* (2013.01); *C01B 32/16* (2017.08);
(Continued)

(58) Field of Classification Search
CPC ..... C01B 21/064; C01B 21/072; C01B 32/16; C01B 32/158; C01B 32/159;
(Continued)

(56) References Cited

U.S. PATENT DOCUMENTS

| 7,045,108 B2 | 5/2006 | Jiang et al. |
| 8,173,211 B2 | 5/2012 | Shaffer et al. |

(Continued)

FOREIGN PATENT DOCUMENTS

| CN | 101475159 A | 7/2009 |
| CN | 101734641 A | 6/2010 |

(Continued)

OTHER PUBLICATIONS

"Radiation," accessed online at: https://energyeducation.ca/encyclopedia/Radiation on May 17, 2021 (Year: 2021).*
(Continued)

*Primary Examiner* — Daniel C. McCracken
(74) *Attorney, Agent, or Firm* — Fogg & Powers LLC

(57) ABSTRACT

In an embodiment, a method includes liberating feed atoms and forming at least one nanotube from the liberated feed atoms. Feed atoms disposed over a front side of a substrate are liberated in response to electromagnetic radiation that propagates from the back side of the substrate, through the substrate, to the front side of the substrate. And, from the liberated feed atoms, at least one nanotube is formed over the front side of the substrate in response to at least one catalyst separate from the substrate and disposed over the front side of the substrate and over the feed atoms.

18 Claims, 9 Drawing Sheets

Related U.S. Application Data continuation-in-part of application No. 14/037,034, filed on Sep. 25, 2013, now Pat. No. 9,371,232, and a continuation-in-part of application No. 13/694,088, filed on Oct. 29, 2012, now abandoned.

(51) Int. Cl.

| | | |
|---|---|---|
| *C23C 28/00* | (2006.01) | |
| *C23C 26/00* | (2006.01) | |
| *C01B 32/16* | (2017.01) | |

(52) U.S. Cl.
CPC ............ *C23C 26/00* (2013.01); *C23C 28/321* (2013.01); *C23C 28/322* (2013.01); *C23C 28/34* (2013.01); *C01P 2004/13* (2013.01)

(58) Field of Classification Search
CPC ... C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C23C 28/321; C23C 26/00; C23C 28/322; C23C 28/34; C01P 2004/13
See application file for complete search history.

(56) References Cited

U.S. PATENT DOCUMENTS

| | | | |
|---|---|---|---|
| 8,206,674 B2 | 6/2012 | Smith et al. | |
| 8,926,934 B2 | 1/2015 | Jiang et al. | |
| 9,239,224 B2 | 1/2016 | Laubscher | |
| 2009/0252886 A1 | 10/2009 | Barker et al. | |
| 2011/0008240 A1* | 1/2011 | Inoue | C01B 32/162 |
| | | | 423/447.7 |
| 2011/0162957 A1* | 7/2011 | Wardle | C01B 32/16 |
| | | | 204/157.63 |
| 2013/0306490 A1 | 11/2013 | Laubscher | |
| 2014/0120028 A1 | 5/2014 | Laubscher | |
| 2014/0120029 A1 | 5/2014 | Laubscher | |
| 2017/0142819 A1 | 5/2017 | Poenitzsch et al. | |

FOREIGN PATENT DOCUMENTS

| | | |
|---|---|---|
| CN | 102574688 A | 7/2012 |
| CN | 103794552 A | 5/2014 |
| RU | 2393276 C1 | 6/2010 |
| RU | 2478572 C2 | 4/2013 |
| RU | 2491311 C2 | 8/2013 |
| WO | 2013119295 A1 | 8/2013 |
| WO | 2014070565 A2 | 5/2014 |

OTHER PUBLICATIONS

Alexandrescu, et al., Synthesis of carbon nanotubes by CO2-laser-assisted chemical vapour deposition, Infrared Physics & Technology 2003; 44: 43-50 (Year: 2003).*

Intellectual Property India, "Office Action from IN Application No. 201817034339", from Foreign Counterpart to U.S. Appl. No. 15/043,952, dated Jul. 7, 2020, pp. 1 through 7, Published: IN.

Russian Patent Office, "Office Action from RU Application No. 2018132725", from Foreign Counterpart to U.S. Appl. No. 15/043,952, dated Jul. 30, 2020, pp. 1 through 18, Published: RU.

Japanese Patent Office, "Notice of Reasons for Rejection from JP Application No. 2018-561194", from Foreign Counterpart to U.S. Appl. No. 15/043,952, dated Jan. 6, 2021, pp. 1 through 5, Published: JP.

European Patent Office, "Extended European Search Report from EP Application No. 17753675.2", from Foreign Counterpart to U.S. Appl. No. 15/043,952, dated Feb. 13, 2020, pp. 1-13, Published: EP.

Russian Patent Office, "Office Action from RU Application No. 20181327525", from Foreign Counterpart to U.S. Appl. No. 15/043,952, dated Feb. 19, 2021, pp. 1 through 7, Published: RU.

European Patent Office, "Invitation pursuant to Rule 63(1) from EP Application No. 17753675.2 dated Sep. 17, 2019", from Foreign Counterpart to U.S. Appl. No. 15/043,952, pp. 1-9, Published: EP.

International Bureau, "International Preliminary Report on Patentability from PCT Application No. PCT/US2017/017583 dated Aug. 21, 2018", from Foreign Counterpart to U.S. Appl. No. 15/043,952, pp. 1-7, Published: WO.

International Searching Authority, "International Search Report and Written Opinion from PCT Application No. PCT/US2017/017583 dated Apr. 13, 2017", from Foreign Counterpart to U.S. Appl. No. 15/043,952, pp. 1-8, Published: WO.

U.S. Patent and Trademark Office, "Final Office Action", U.S. Appl. No. 15/043,952, dated Jun. 25, 2019, pp. 1-16, Published: US.

U.S. Patent and Trademark Office, "Notice of Allowance", U.S. Appl. No. 15/043,952, dated Oct. 24, 2019, pp. 1-12, Published: US.

U.S. Patent and Trademark Office, "Office Action", U.S. Appl. No. 15/043,952, dated Apr. 6, 2018, pp. 1-15, Published: US.

U.S. Patent and Trademark Office, "Restriction Requirement", U.S. Appl. No. 15/043,952, dated Jun. 15, 2017, pp. 1-8, Published: US.

Russian Patent Office, "Decision to Grant a Patent for Invention from RU Application No. 2018132725", from Foreign Counterpart to U.S. Appl. No. 15/043,952, dated May 28, 2021, pp. 1 through 16, Published: RU.

China National Intellectual Property Administration, "First Office Action from CN Application No. 201780019697.9", from Foreign Counterpart to U.S. Appl. No. 15/043,952, dated Jul. 26, 2021, pp. 1 through 23, Published: CN.

* cited by examiner

FREE ATOM NANOTUBE GROWTH

This patent application is a Divisional of U.S. patent application Ser. No. 15/043,952 filed Feb. 15, 2016, which is a continuation-in-part of U.S. Pat. No. 9,371,232, filed Sep. 25, 2013 and issued Jun. 21, 2016, and which is also a continuation-in-part of U.S. patent application Ser. No. 13/694,088, filed Oct. 29, 2012 and now abandoned.

BACKGROUND OF THE INVENTION

1. Field of the Invention

The present invention relates to the growth of nanotubes (NTs). The present invention is derived from a series of experiments designed and conducted using the principles of the previous patent application, TREKANG. The present invention represents a major simplification over the TREKANG concept in that there are no wavides. Wavides were conceived to deliver the energy that stimulates growth to the feedlayer in the vicinity of the catpar. The current experiments prove that wavides are not necessary. NT growth is accomplished by energizing feedatoms in a feedlayer to migrate to a growth site or catpar of the NT. Simply put, this is not a chemical vapor deposition (CVD) technology as the atmosphere of the chemical reactor is an ineratmo. Instead we use a near-ultraviolet (near-uv) or ultraviolet (UV) emrad source in the form of a laser or light emitting diode (LED) lamp to liberate atoms from a feedlayer deposited on a substrate. These liberated atoms migrate to a growth site or catpar where an NT is growing. The current situation can be illustrated by considering the example of carbon nanotubes (CNTs).

2. Problems in Carbon Nanotube Growth

Manmade CNTs are created by various means. Consider one of the most useful techniques, chemical vapor deposition (CVD). Basically, the CVD process involves a carbon bearing gas as a constituent of the atmosphere in a reaction chamber. Some of these gas molecules react with a catpar in the chamber and if the temperature, partial gas pressure and many other parameters are correct, a carbon atom from a gas molecule transitions onto the surface of the catpar and a CNT will grow out of the catpar. This process is quite popular because the CVD process, in general, has proven to be extremely useful, over many decades, in many other endeavors including semiconductor microcircuit fabrication. However, there are drawbacks when this technology is used for CNT growth.

The first drawback is that although initial growth of the CNTs is quite rapid, the growth quickly slows to a crawl and for all intents and purposes stops. Breakthroughs have been made that allow the growth to continue perceptibly, albeit slowly, but a second problem comes into play. The already formed CNTs are immersed in an environment of hot, carbon bearing gasses. Reactions continue on the surface of the CNTs that create imperfections in their highly structured carbon lattice. These imperfections dramatically degrade the physical properties of the CNTs. The longer the growth continues in this environment, the more damage is done to the CNTs. Therefore significant quantities of long (≥1 centimeter for CNTs, many centimeters for BNNTs), highq CNTs are impossible to fabricate. For over a decade, researchers have been trying to find the "right set" of CVD parameters to produce long, highq CNTs without success.

Causes of the dramatic slowdown of CNT growth during the CVD process are currently understood to include:

1) The accumulation of material on the surface of the catpar, suspected to be amorphous carbon. This coating reduces the surface area of the catpar thereby decreasing the opportunity for carbon atoms, appropriate to combine with the growing CNT, to either pass into the catpar or migrate on its surface to the CNT growth location. Thus CNT growth is slowed or terminated.
2) The effect of Ostwald ripening tends to reduce the size of small catpars and increase the size of large catpars by mass transfer from the small to the large. Conceptually this is because small particles are thermodynamically less stable than larger particles. This thermodynamically-driven process is seeking to minimize the system surface energy. The catpar size is important since CNT growth will cease (or not begin in the first place) if the catpar is too large or too small.
3) Although substrates upon which CNTs are grown can be many different substances, the most common substrate is silicon, in part because of the decades of experience with it in the semiconductor industry. Silicon was thought to be impervious to catalyst elements, but in CNT fabrication it has been found that at least some catalyst materials can diffuse into the silicon layer. Thus the effective size of the catpar gets smaller and can become incapable of supporting CNT growth. Other substrates may be porous to catalyst materials as well.

3. Description of the Prior Art

U.S. Pat. No. 7,045,108 describes the growth of CNTs on a substrate and the subsequent drawing of those CNTs off the substrate in a continuous bundle. The abstract states: A method of fabricating a long carbon nanotube yarn includes the following steps: (1) providing a flat and smooth substrate; (2) depositing a catalyst on the substrate; (3) positioning the substrate with the catalyst in a furnace; (4) heating the furnace to a predetermined temperature; (5) supplying a mixture of carbon containing gas and protecting gas into the furnace; (6) controlling a difference between the local temperature of the catalyst and the furnace temperature to be at least 50.degree. C.; (7) controlling the partial pressure of the carbon containing gas to be less than 0.2; (8) growing a number of carbon nanotubes on the substrate such that a carbon nanotube array is formed on the substrate; and (9) drawing out a bundle of carbon nanotubes from the carbon nanotube array such that a carbon nanotube yarn is formed.

The technique described in the previous paragraph is a representative example of the popular and useful "forest growth" of CNTs and the drawing of a CNT bundle from the forest. It does not discuss any technique for mitigating the causes for CNT growth slowdown.

U.S. Pat. No. 8,206,674 describes a growth technique for boron nitride nanotubes (BNNTs). From the abstract: Boron nitride nanotubes are prepared by a process which includes: (a) creating a source of boron vapor; (b) mixing the boron vapor with nitrogen gas so that a mixture of boron vapor and nitrogen gas is present at a nucleation site, which is a surface, the nitrogen gas being provided at a pressure elevated above atmospheric, e.g., from greater than about 2 atmospheres up to about 250 atmospheres; and (c) harvesting boron nitride nanotubes, which are formed at the nucleation site.

The above technique forms centimeter long BNNT using laser ablation of the boron into a nitrogen atmosphere. The growth occurs at a rough spot around the ablation crater and the growth streams in the direction of the nitrogen flow. A catalyst material need not be present. The technology does not allow for the control of growth or the use of this laser ablation technology to grow CNTs.

U.S. Pat. No. 8,173,211 describes CVD CNT growth process that is continuous. From the abstract: A method of production of carbon nanoparticles comprises the steps of: providing on substrate particles a transition metal compound which is decomposable to yield the transition metal under conditions permitting carbon nanoparticle formation, contacting a gaseous carbon source with the substrate particles, before, during or after said contacting step, decomposing the transition metal compound to yield the transition metal on the substrate particles, forming carbon nanoparticles by decomposition of the carbon source catalyzed by the transition metal, and collecting the carbon nanoparticles formed.

The technique described in the previous paragraph is the technique in which the catalyst is dispersed into the carbon-bearing gas flow of the reactor. It produces CNTs of up to approximately 0.5 mm in length. The CNTs appear as smoke and can be drawn off continuously. However, the technology has been unable to grow long, highq CNTs.

U.S. Pat. No. 8,926,934 describes a laser-assisted CVD CNT growth process. From the abstract: A method for growing an array of carbon nanotubes includes the steps of: (a) providing a substrate; (b) forming a catalyst film on the substrate, the catalyst film including carbonaceous material; (c) introducing a mixture of a carrier gas and a carbon source gas flowing across the catalyst film; (d) focusing a laser beam on the catalyst film to locally heat the catalyst to a predetermined reaction temperature; and (e) growing an array of the carbon nanotubes from the substrate.

The technique described in the previous paragraph is a CVD-based, laser-assisted growth process in which the laser is used to heat the catalyst to the temperature that promotes the cracking of the carbon bond in the precursor gas. Using the laser as a heater is an incremental step from a traditional CVD system and retains many of the drawbacks of CVD growth mentioned above. The technology has been unable to grow long, highq CNTs.

SUMMARY OF THE INVENTION

The present invention is a technology for growing NTs by liberating feedatoms so that the free atoms can migrate to a growth site or catpar of the NT. Simply put, this is a non-CVD process: there is no hot, carbon bearing gas. One embodiment, shown in FIG. 1, is to fabricate a substrate with a feedlayer of feedatoms on its front side and a layer of catalyst over the front side of the feedlayer. Emrad incident upon the bottom of the substrate propagates to the feedstock layer and liberates feedatoms that migrate to a growth site or catpar where an NT is growing. The free atoms are incorporated into the growing NT. The parameters of the emrad and substrate properties can be used to ensure that the feedatoms are liberated and migrate to a growth site or catpar with the appropriate energy to grow an NT.

Consider the case of CNT growth accomplished by the experiments upon which the present invention is based (see FIG. 1). A near-uv laser (emrad source) was used to illuminate a quartz substrate from the back side. The photons (emrad) propagate through the substrate and most are absorbed in a layer of amorphous carbon atoms (feedlayer) on the front side of the substrate. The carbon atoms (feedatoms) that absorb the photons are liberated from the amorphous carbon and some of them migrate to a CNT growth site where they are incorporated to a growing CNT. This is the basics of the present invention.

DETAILED DESCRIPTION OF THE INVENTION

1. Definitions

Figure 1:
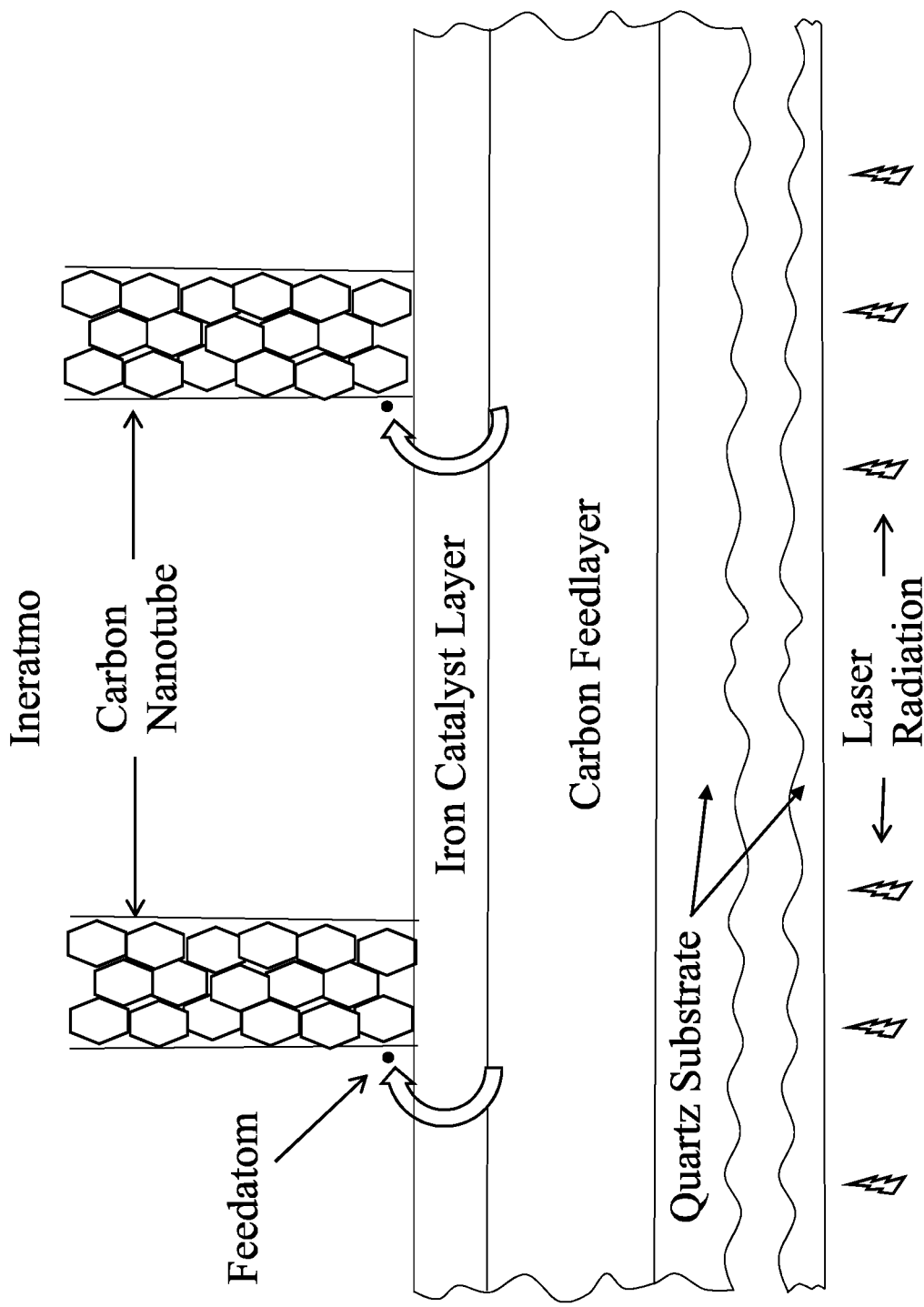
FIG. 1 illustrates schematically the embodiment of the present invention in which the NTs grow directly out of the catalyst layer.

BNNT—When used herein shall refer to a boron nitride nanotube.

Broadtip system—When used herein shall refer to a NT growth system comprising a broadtip assembly mounted to an articulated arm which is itself mounted to a motion stage. This system grows NTs from the broadtip substrate assembly and deposits them onto an adjacent "target surface". The motion of the broadtip assembly across the adjacent target surface enables patterned three dimensional deposition of NTs. Broadtips are analogous to tratips but are larger with many catalyst particles. Because of their size emrad is used to deliver the energy to the feedlayer instead of plasmons. See FIGS. 5, 6 and 7.

Broadtip assembly—When used herein shall refer to a subsystem comprising a broadtip substrate assembly mated to an emrad source and packaged to be mounted to an articulated arm for use in a broadtip system. See FIGS. 5 and 7.

Broadtip substrate assembly—When used herein shall refer to a substrate assembly subsystem configured to be integrated into a broadtip assembly and used in a broadtip system. See FIGS. 5 and 6.

Catpar—When used herein shall refer to a volume of catalyst material, wherein the size, shape and elemental constituents are appropriate for growing a nanotube: a catalyst particle. The catalyst may contain one or more elemental constituents.

CNT—When used herein shall refer to a carbon nanotube.

Emrad—When used herein shall refer to electromagnetic radiation, however generated and of appropriate wavelength, to stimulate CNT growth within the technique being described.

Feedatom—When used herein shall refer to an atom or molecule that is a chemical constituent of a nanotube: the atomic feedstock of a nanotube.

Feedlayer—When used herein shall refer to a layer of nanotube feedstock atoms (feedatoms) that may comprise other constituents such as catalyst material.

Feedvoir—When used herein shall refer to a reservoir of nanotube feedstock atoms (feedatoms) that may contain other constituents such as catalyst material.

Growth site—When used herein shall refer to a position on a catalyst layer where a nanotube grows out of the surface. In the case of nanotube growth at a growth site, the catalyst layer has not been annealed so catpars have not formed.

Highq—When used herein shall refer to nearly defect free: high quality. A highq NT is a nanotube that is nearly pristine, perfect and defect free. As such its tensile strength and electrical properties are maximal.

Ineratmo—When used herein shall refer to the inert, gaseous atmosphere in a CNT growth chamber: an inert atmosphere. If the sides of the substrate are isolated then it refers to the atmosphere on the nanotube growth side (front side) of the substrate. This "inert" atmosphere generally is made up of inert gasses. However, if partial pressures of other gasses, including ones introduced to react with NTs, catpars and/or free carbon, are introduced into the atmosphere during the growth process, the term interatmo still applies.

Liberate—When used herein shall refer to the process or process by which a feedatom absorbs emrad and breaks its chemical bonds to other atoms in the feedlayer or feedvoir thereby becoming free to migrate.

Migrate—When used herein shall refer to the process or processes by which a feedatom travels from a feedlayer or feedvoir to a growth site or catpar after being energized. Migrate is a more general form of trek that encompasses trekking to a growth site as well as a catpar.

NT—When used herein shall refer to a nanotube.

Plasmon—When used herein shall refer to a quantum of plasma oscillation. This includes all types of plasmons and polaritons such as exciton-polaritons and surface plasmon polaritons. In the context of the current invention, under the right conditions, electromagnetic energy can be transformed at a surface into plasmons capable of propagating the energy through a medium.

Figure 3:
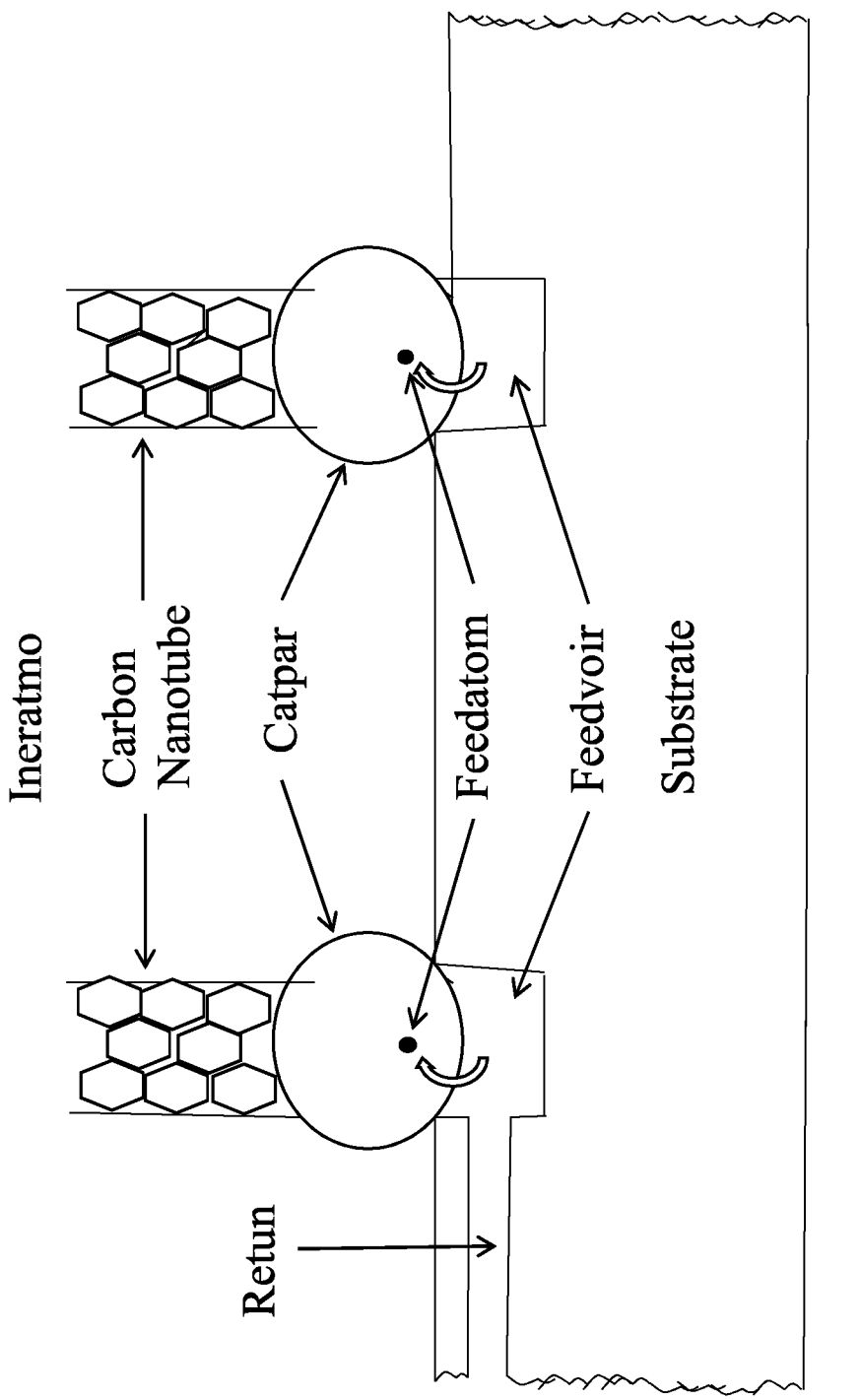
FIG. 3 illustrates schematically the embodiment of the present invention in which the NTs grow directly out of catpars and the feedlayer has been replaced with a feedvoir replenished by a retun.

Retun—When used herein shall refer to a replenishment tunnel or other structure in a substrate or wavide that facilitates the replenishment of feedatoms, catalyst material, and/or other materials for nanotube growth. FIG. 3 illustrates a notional retun.

Substrate assembly—When used herein shall refer to a subsystem comprising a substrate, a feedlayer deposited onto the front side of the substrate and one of two catalyst configurations, either a catalyst layer or catpars, arranged on the front side of the feedlayer.

Figure 9:
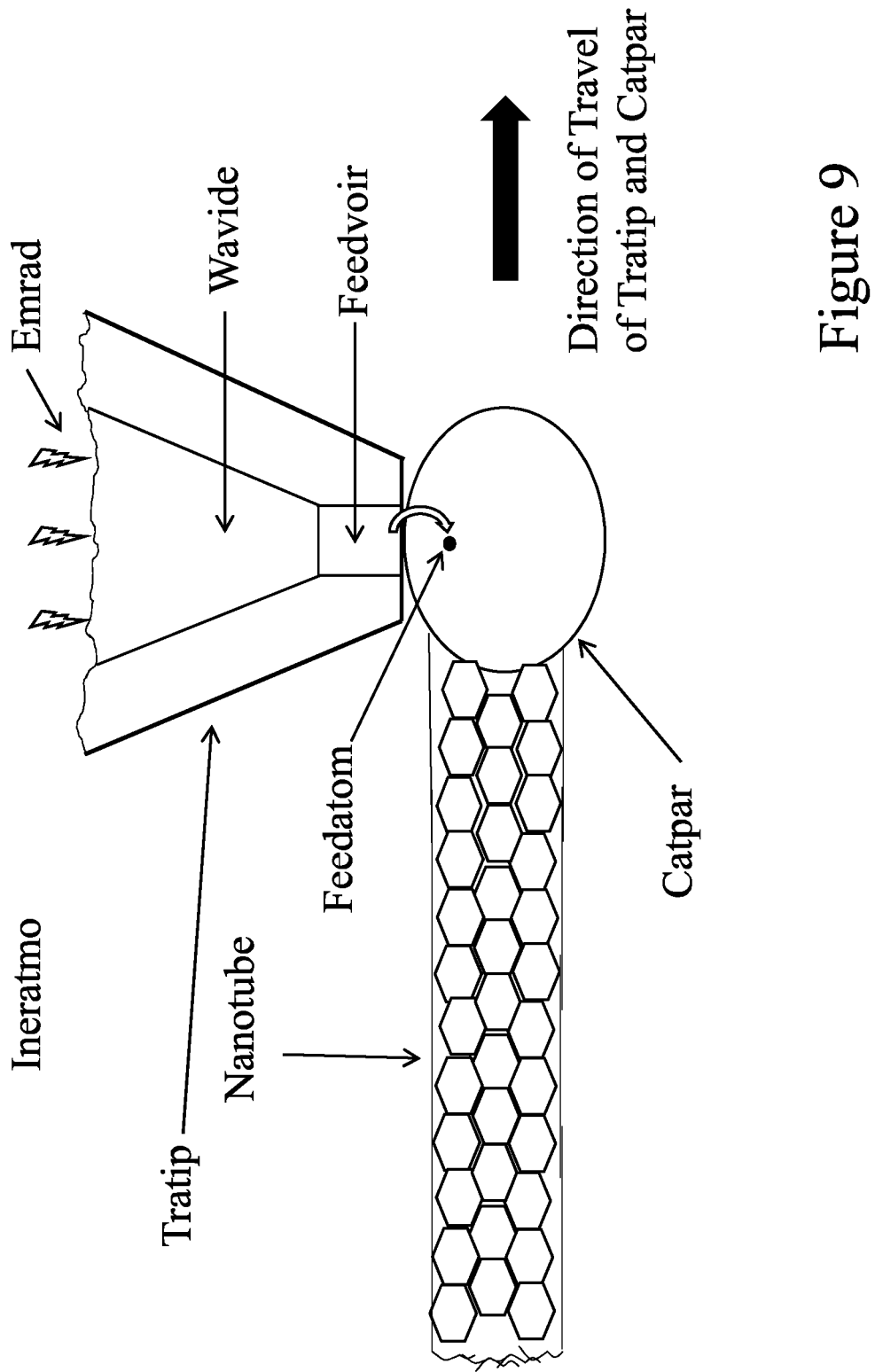
FIG. 9 illustrates schematically the tratip from the TREKANG patent application.

Tratip—When used herein shall refer to a traveling micro or nanoscale platform or tip. A nanotube is grown from a catpar attached to the end of the tratip, a moveable platform. The platform or tip is a part of a cantilever or other support structure that facilitates the movement of the nanoscale nanotube growing system. Thus the nanotube may be grown vertically, horizontally or at an angle to enable structured nanotube growths to be fabricated. A tratip is analogous to the sensing tip of an atomic force microscope which is attached to a cantilever. FIG. 9 illustrates a tratip. Alternatively, the tratip could be stationary and the target surface or volume, upon which the nanotube growth is being deposited, could be mobile.

Trek—When used herein shall refer to the process or processes by which a feedatom travels from a feedlayer or feedvoir to a catpar after being energized. Trekking is the verb form of trek.

Wavide—When used herein shall refer to a waveguide through a substrate that transports energy in the form of emrad or plasmons.

2. Best Mode of the Invention

Figure 2:
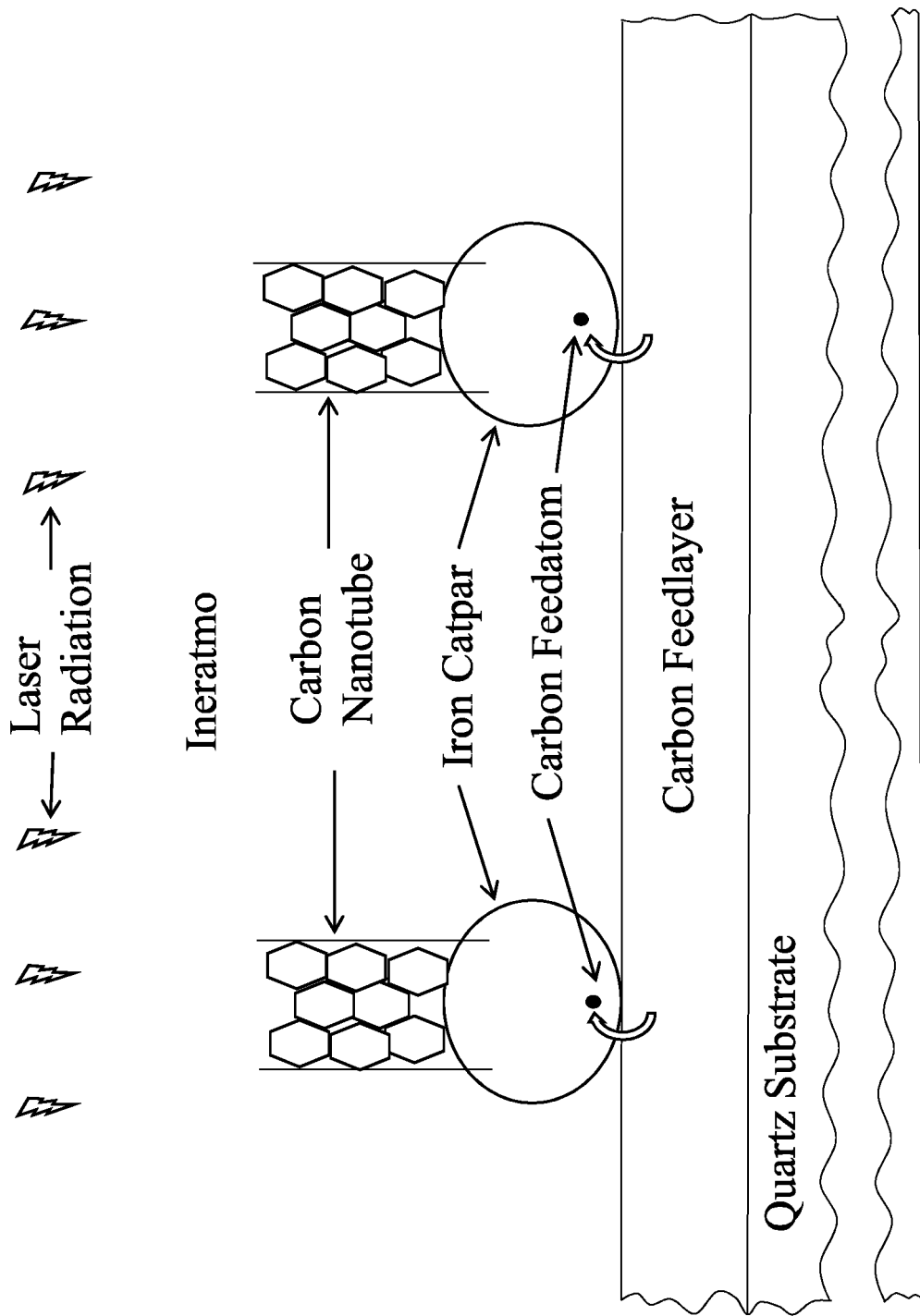
FIG. 2 illustrates schematically the embodiment of the best mode present invention in which the NTs grow directly out of catpars.

FIG. 2 illustrates the best mode contemplated by the inventor of Free Atom Nanotube Growth according to the present invention. The embodiment in FIG. 2 has an array of catpars arranged on the front side of the carbon feedlayer. The feedlayer has been located on the front side of quartz substrate. Emrad in the form of laser radiation is incident from the front side of the substrate assembly. The laser photons liberate some carbon feedatoms from the feedlayer and some of these free atoms migrate to the catpars. At the catpar some of the carbon atoms are incorporated into the growing CNT.

3. The Workings of the Invention

In a reaction chamber, the system shown in FIG. 1 grows CNTs. Emrad, in the form of laser radiation, incident on the bottom of the substrate propagates through the substrate that is transparent to the emrad. The emrad propagates to the feedlayer. All or most of the emrad energy is absorbed in the feedlayer. This energy liberates some of the carbon feedatoms in the feedlayer to migrate (shown by the arrow) through the very thin iron catalyst layer to the growth site growing a CNT. Ideally, the feedatoms are transported to the growth site with an optimal energy for becoming a part of the CNT growing from the catpar. The atmosphere in the chemical reactor where CNT growth is occurring is an ineratmo.

The targeting of the feedatoms with the energy required to drive the NT growth process makes possible much lower temperature growth than CVD. The low temperature of the substrate during CNT growth made possible by the present invention decreases or eliminates unwanted, extraneous chemical reactions such as amorphous carbon buildup on the surface of the catpars, thereby increasing the time growth may continue.

The interatmo environment also decreases or eliminates amorphous carbon build up on the catpars. Additionally, the ineratmo decreases or eliminates damage to growing CNTs from unwanted chemical reaction on their surfaces because the hot carbon gas environment of CVD has been eliminated.

Ostwald ripening, a thermodynamic process that results in small catpars generally losing catalyst atoms to larger catpars. As Ostwald ripening occurs, more catpars stop growing CNTs because the either become too large or too small to sustain CNT growth. The low temperature synthesis possible with the present invention decreases the rate of Ostwald ripening.

FIG. 3 illustrates the feedvoir embodiment of the current invention which comprises a feedvoir sitting between the catpar and substrate instead of a feedlayer. The larger the feedvoir, the more feedatoms are available for NT growth. Sizing these feedvoirs or the amount of feedatoms contained in feedvoirs enables the tailoring of the growth of NTs, including tailoring the length of the NTs resulting from a given growth run.

One of the feedvoirs in FIG. 3 illustrates a retun through the substrate for replenishing the feedatoms, catalyst material and/or other materials for NT growth. This represents a variation of the feedvoir embodiment wherein retuns facilitate the replenishment of feedatoms, catalyst material and/or other materials for NT growth from another reservoir. This reservoir would most probably be off the substrate on which the NTs are growing. In this way, continuous NT growth may be accomplished, especially in the case of industrial-scale growth in a manufacturing environment.

Both feedlayers and feedvoirs are not limited to containing only feedatoms. Catalyst or other materials that are found to be beneficial for the growth of NTs can be added to the feedatoms in the feedlayers or feedvoirs. These materials could be layered or otherwise arranged with feedatoms in the feedlayers or feedvoirs to be liberated at different stages of the growth process.

FIG. 9 illustrates the tratip embodiment of the TREKANG patent application comprising a catpar residing on a tratip. In this case the tratip can grow the NT while on the move, enabling growth of an NT in three dimensions. Such capability enables NTs to be deposited on an adjacent target surface in patterns. The next embodiment of the present invention is analogous to the tratip.

Figure 5:
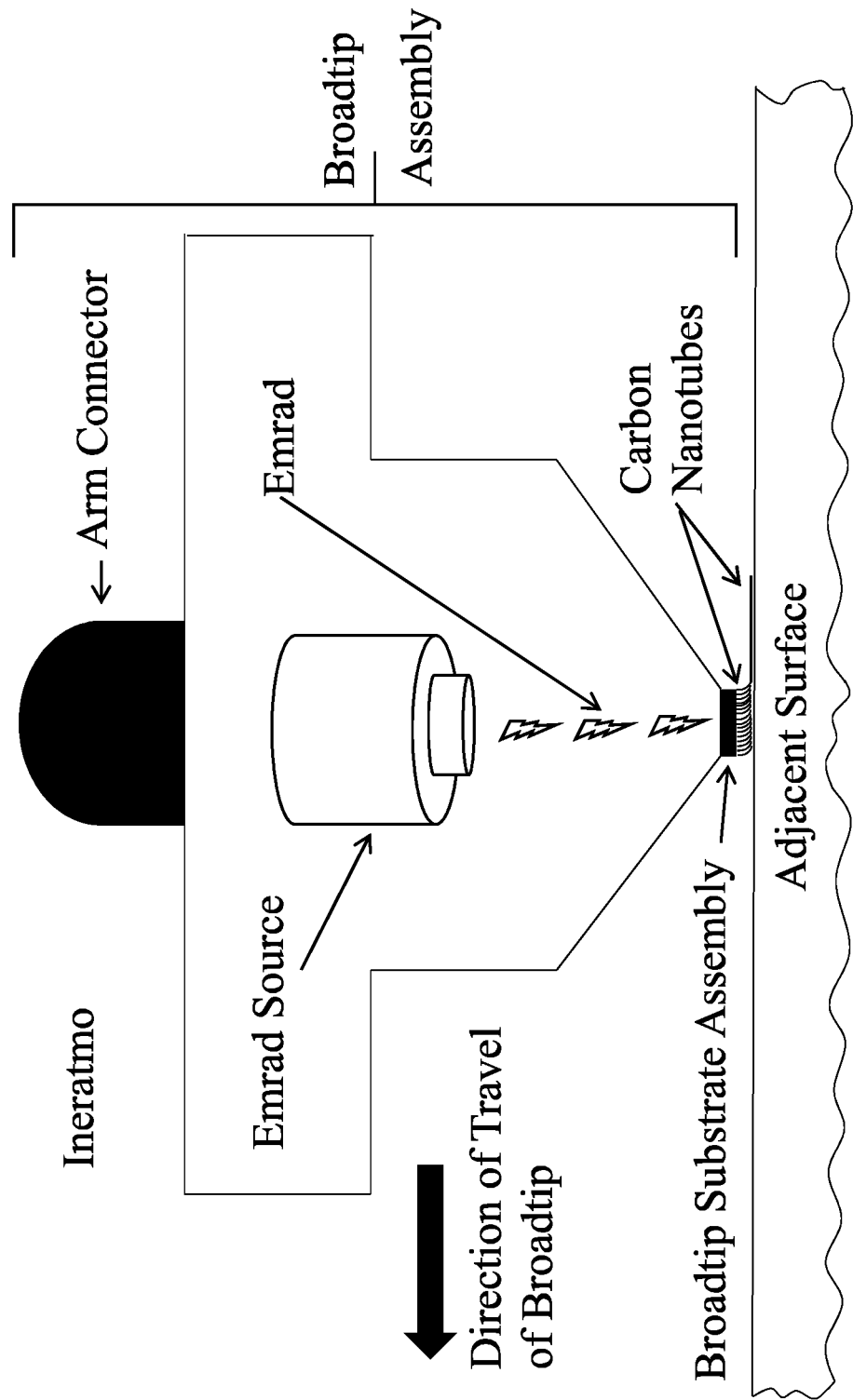
FIG. 5 illustrates schematically the broadtip assembly embodiment of the present invention.
Figure 6:
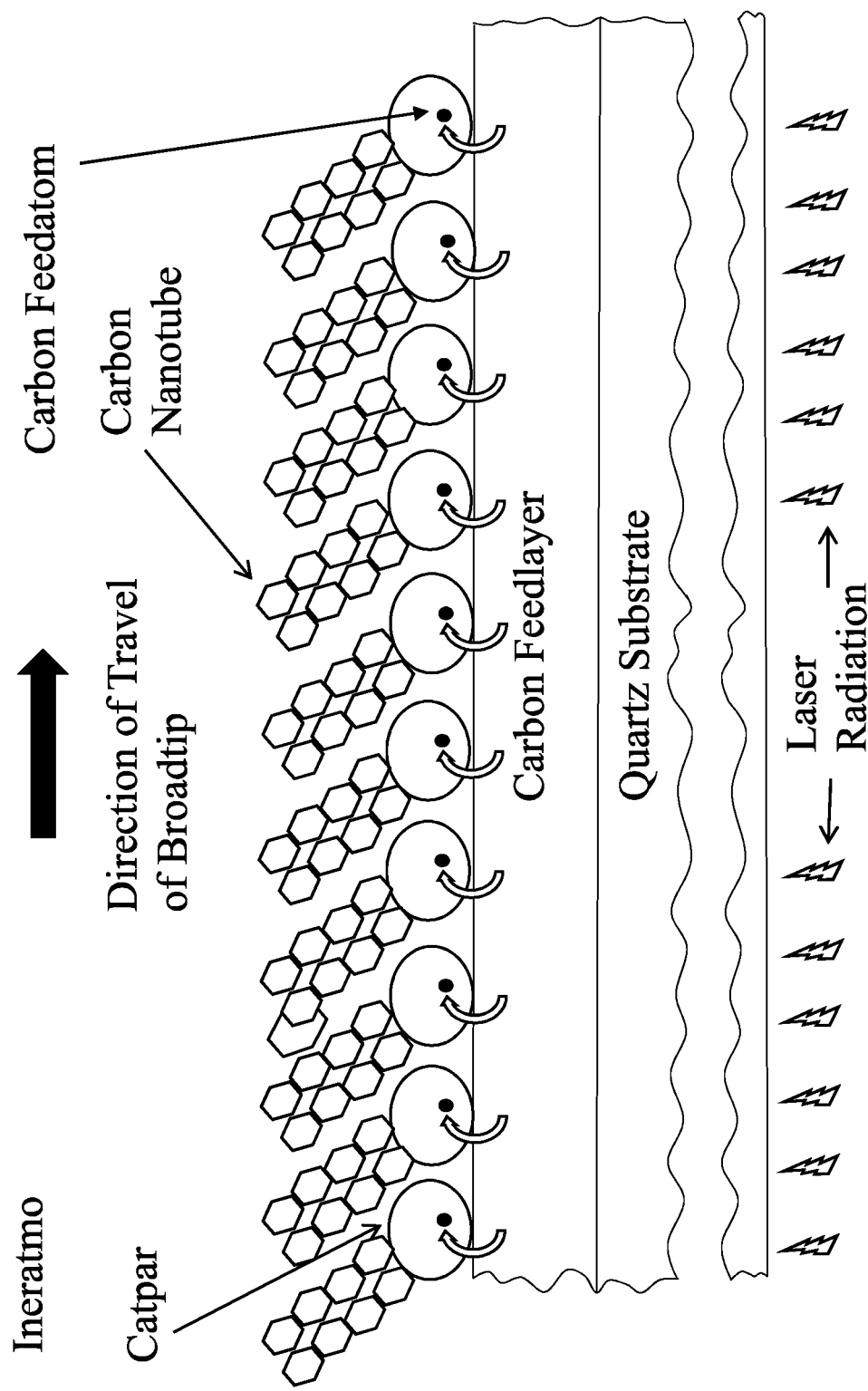
FIG. 6 illustrates schematically a close view of a portion of the broadtip substrate assembly embodiment of the present invention.
Figure 7:
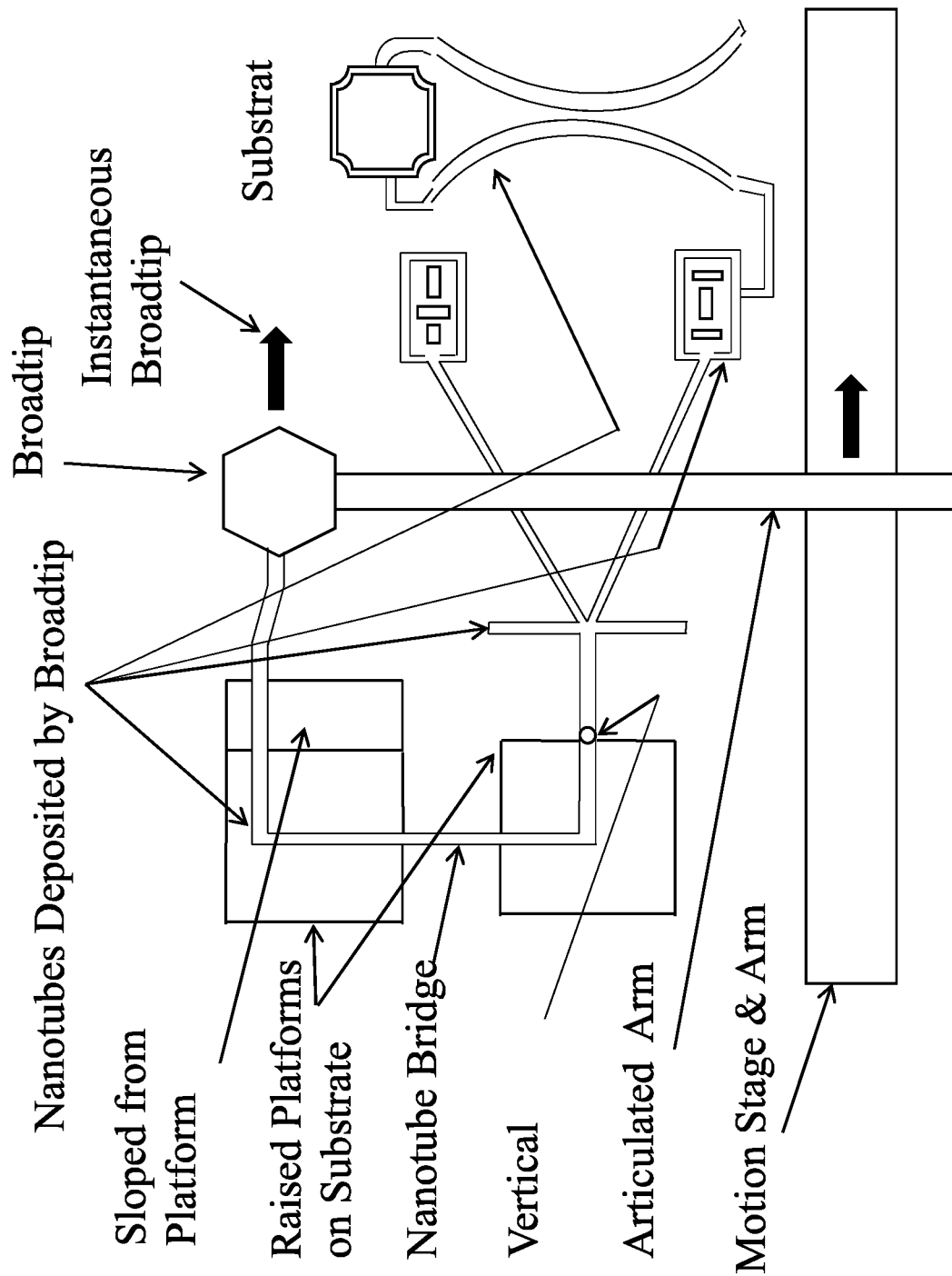
FIG. 7 illustrates schematically the broadtip assembly mounted to the articulated arm and motion stage in operation according to the present invention.

Another embodiment of the current invention is the broadtip system shown in FIGS. 5, 6 and 7. The broadtip system comprises the broadtip assembly; broadtip substrate assembly; the articulating arm; and the motion stage that together facilitate the three dimensional motion. In direct analogy of the tratip of the TREKANG application, the broadtip system is a large tratip. The scale of the broadtip substrate assembly is tens to thousands of growth sites or catpars instead of one catpar in the case of a tratip. The broadtip substrate assembly is so large plasmons are not required to couple energy to its feedlayer or feedvoir. Like the tratip, the broadtip assembly is mounted onto an articulated arm and motion stage that facilitates three dimensional motion across an adjacent target surface upon which the broadtip system deposits nanotubes that are growing from the broadtip substrate assembly. The emrad energizing nanotube growth from a broadtip substrate assembly may propagate from the back side of the broadtip substrate assembly, may be incorporated into the broadtip substrate assembly, or propagate from the front side through a transparent adjacent target surface onto the broadtip substrate assembly. Indeed, the three dimensional growth pattern may be controlled by manipulating the emrad intensity, emrad pattern on the broadtip substrate assembly and by turning the emrad source on and off.

4. How to Make the Invention

Substrate Assembly Considerations

The substrate assembly is made by coating on the front side a thick feedlayer (~150 nm) of feedatoms and a thin layer (~3 nm) of catalyst. Other coating technologies can be used as well. General substrate requirements include 1) the ability to be used in the coating technology processes, 2) the ability to be coated by the various types of feedatoms and catalysts, 3) being relatively impervious to the dissolution of the feedatom and catalyst into the substrate, and 4) the ability to withstand any temperature experienced during a possible annealing step and during the growth of NTs. If the emrad will be incident onto the substrate from the back side then the substrate must be transparent to the emrad.

Although the substrate used for the experiments was flat and smooth, the substrate may be contoured to concentrate the catalyst and position the catpar. Even in the case of no annealing to form catpars, a roughened or contoured substrate would create more growth sites in the form of irregularities in the otherwise smooth catalyst layer. The substrate assembly properties can be used to tune the amount of energy delivered to the feedlayer or feedvoir. These properties include the substrate contour, thickness and material properties such as transparency.

Other nanotubes such as silicon (SI), boron nitride (BN), aluminum nitride (AlN) and gallium nitride (GN) can be grown by the current invention. The feedlayer composition would need to be modified to provide the proper feedatoms. The emrad wavelength range would be required to energize the feedatoms to migrate. Two emrad sources of differing wavelength ranges can be used to energize two species of feedatoms.

It is expected that this nanotube growth technology will work with all metal catalysts such as of iron, nickel, cobalt, copper, gold, silver, platinum, palladium, manganese, chromium, tin, magnesium, aluminum, yttrium, vanadium, molybdenum, rhenium, and alloys of these metals.

Emrad Coniderations

The emrad may be generated by laser, LED, fluorescent lamp or incandescent lamp. Generally, emrad sources would be external to the substrate. However, in the case of an LED or nanolaser these sources could be fabricated as a part of the substrate. Also, an optical amplifier may be fabricated separately or as part of the substrate to amplify an emrad source.

Requirements for the emrad source include possessing a wavelength or wavelength range absorbed by the feedlayer, and, once absorbed, imparting enough energy to the absorbing feedatoms to free them to migrate. These free atoms would then form NTs at the growth site or catpar. The wavelength of this emrad should be as short as possible and still fit other criteria such as the required laser power, cost and safety of carrying out the experiment. A laser of 405 nm wavelength and a 365 nm LED lamp were chosen for the experiments.

A feature of the present invention is that NT growth may be paused or ceased by stopping the emrad. This could allow the fine tuning of NT length or a way to accurately begin and end different stages of NT growth in a multi-stage growth scenario.

Ineratmo Considerations

The ineratmo mitigates extraneous reactions from atmospheric gasses. Because in the present invention the feedatoms for NT growth do not come from the atmospheric gasses; the constituent gasses, pressure and temperature of the atmosphere can be adjusted to optimize NT growth. The ineratmo gasses may be circulated, filtered, exchanged, monitored and/or changed to facilitate control of the ineratmo constituents, temperature and pressure, thereby maintaining an optimal atmosphere in the reaction chamber. Finally, the ineratmo can be altered during growth process as required to continue growth, change NT characteristics, and functionalize NTs.

Miscellaneous Considerations

Real time diagnostic measurements may be employed to measure and control the growth and functionalization of NTs. These diagnostics include the NT growth rate and structure; catalyst temperatures, pressures and compositions; feedatom transport; and ineratmo compositions, temperatures and pressures.

Free Atom Nanotube Growth technology may be adapted to grow assemblages of atoms thereby forming molecules, structures, shapes and machines in an accurate and controlled manner. These assemblages formation processes may or may not require a catalyst to facilitate the formation of the assemblage.

5. Experimental Examples

Proof-of-principle experiments based upon the principles claimed in the Trekking Atom Nanotube Growth (TREKANG) patent application have been performed and are continuing. The results of the experiments are the basis of this patent application, the Free Atom Nanotube Growth (FANG) application.

A set of basic, proof-of-principle experiment were devised and executed. The major simplification over the TREKANG concept is that there are no wavides. Wavides were conceived to deliver the energy that stimulates growth to the feedlayer in the vicinity of the catpar. The current experiments prove that wavides are not necessary. Further experiments to determine the parameter space over which nanotubes can be grown are continuing.

FIG. 1 is a schematic illustration of the experimental configuration for most experiments. A two-inch diameter, 6 mm thick quartz disc was used as the substrate. A 140 nm layer of carbon was sputtered onto the front surface of the substrate to form a feedlayer with carbon feedatoms. The sputtered carbon forms an amorphous carbon layer. On the front side of the of the carbon feedlayer a 2-3 nm layer of iron was sputtered. The iron is a catalyst for carbon nanotube growth. The iron layer completes the substrate assembly that consists of the substrate and its carbon and iron layers. The emrad that enters from the bottom of the picture and traverses the quartz substrate is mostly absorbed in the carbon layer. In most experiments the emrad source was a 405 nm, near-uv laser. Other experiments used a 365 nm UV LED lamp. The atmosphere in the chemical reactor chamber, the ineratmo, was composed of argon gas. FIG. 1 also illustrates an unexpected property: carbon nanotubes grew without catpar formation. To the limit of resolution, scanning electron microscope images show the carbon nanotubes growing out of the surface of the iron layer.

FIG. 2 is a schematic illustration of another experimental configuration which is the best mode of the present invention as conceived by the inventor. One difference in FIG. 2 from FIG. 1 is that the catalyst layer has been annealed to form catpars. The second difference is that the emrad, laser radiation in most experiments, is incident from the front side of the substrate assembly. Carbon nanotubes have been grown from catpars in some of the experiments. Most experiments have been carried out with the radiation incident from the front side of the substrate assembly because the insertion and extraction of the assembly is simpler when the front side is toward the emrad source. However experiments have shown NT growth from emrad illuminating either side of the quartz substrate.

Figure 4:
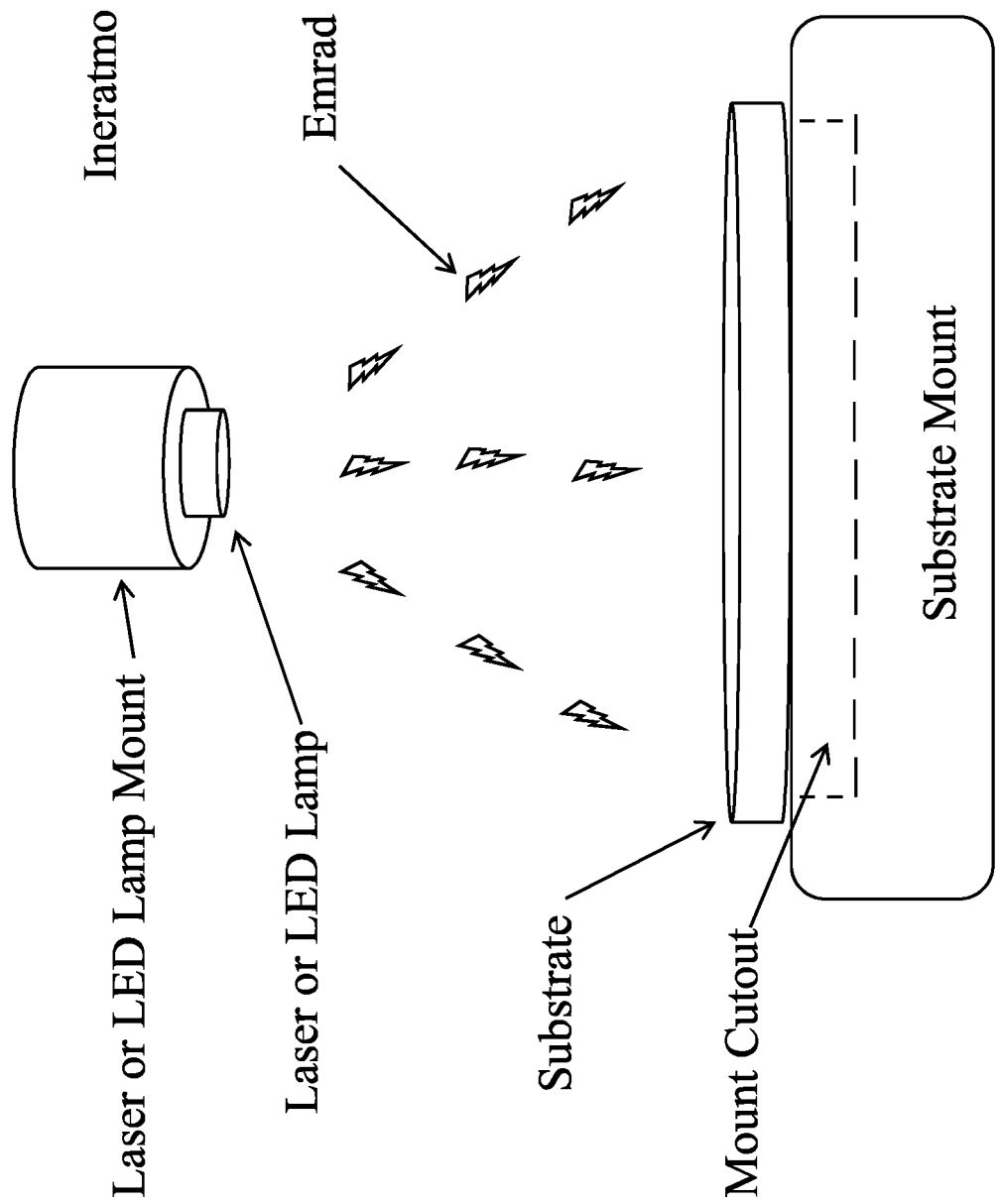
FIG. 4 illustrates schematically the basic experimental setup for most of the experiments that have been carried out at the present time.

FIG. 4 illustrates schematically the basic experimental configuration. The substrate can be mounted on the substrate mount with either the front side or back side facing the laser or lamp. Not shown in FIG. 4 are the heaters and thermocouples that are attached to the substrate mount.

The optimum temperature, pressure, radiation irradiance, radiation wavelength, carbon layer thickness and iron layer thickness have not been determined. Carbon nanotubes were grown with the substrate at ambient temperature and 200 C; argon gas pressures ranging from 50 to 200 Torr; irradiances of a few to tens of milliWatts per square centimeter; and wavelengths of 405 and 365 nm radiation. Experiments are continuing to map out the NT growth parameter space.

6. How to Use the Invention

In the research laboratory, the Free Atom Nanotube Growth technology will enable researchers to grow large amounts of long, highq NTs thereby stimulating research into the properties of the NTs and the macroscopic assemblages formed using these materials. In the case of CNTs these properties include very high tensile strength, high thermal conductivity, for some chiralities low conductivity and the ability to sustain very high electrical current densities, and for other chiralities semiconductor properties. In the case of BNNTs, interesting properties include high tensile strength, high thermal conductivity, low electrical conductivity and neutron absorption based upon the presence of boron. Indeed, the long, highq NTs may reveal properties and applications that are not possible with the currently available NTs. Moreover, the long, highq nanotubes can be used to construct: 1) enhanced strength structures; 2) enhanced conductivity conductors, wires, microscale and nanoscale integrated circuits, microscale and nanoscale transistors, diodes, gates, switches, resistors, capacitors, single sensors and arrays; 3) receivers, rectennas or electromagnetic radiation emitting structures; 4) surface geometries to promote or prevent biological growth; 5) surfaces with special optical, reflective, interference or diffractive properties; 6) surfaces to promote or prevent chemical reactions; 7) structures with certain material properties including strength, hardness, flexibility, density, porosity, etc.; and 8) surfaces that emit particles such as electrons under electrical stimulation (field emission).

The method for FANG nanotube growth would comprise the steps of: 1) preparing a substrate including modifying its surface to have a desired roughness and contouring; 2) laying down a feedlayer onto the substrate; 3) completing a substrate assembly by laying down a thin film of catalyst on the surface of the feedlayer; 4) forming catpars from the thin catalyst film by annealing; 5) installing the assembly in a reaction chamber and sealing the chamber; 6) replacing the atmosphere in the reaction chamber with an ineratmo; 7) adjusting the temperature of the substrate assembly and the pressure of the ineratmo; 8) starting the emrad source to energize feedatoms to migrate to growth sites or catpars; and 9) operating the system for the time interval to achieve the desired NT growth results.

In terms of a FANG broadtip system nanotube growth would comprise the steps of: 1) preparing a substrate for a broadtip substrate assembly including proper sizing and modifying its surface to have a desired roughness and contouring; 2) laying down a feedlayer onto the broadtip substrate; 3) completing the broadtip substrate assembly by laying down a thin film of catalyst on the surface of the feedlayer; 4) forming catpars from the thin catalyst film; 5) installing the broadtip substrate into a broadtip assembly; 6) attach the broadtip assembly to an articulated arm; 7) finish a broadtip system construction by attaching the articulated arm to a motion stage; 8) install a target surface upon which a pattern of nanotubes is to be deposited into a reaction chamber; 9) installing the broadtip system into the reaction chamber including connecting electrical leads and sealing the chamber; 10) replacing the atmosphere in the reaction chamber with an ineratmo; 11) adjusting the temperature of the broadtip substrate assembly and the pressure of the ineratmo and 12) initiating an automatic NT growth and motion control system to initiate growth and the motion to deposit a desired pattern on the target surface.

If the researcher doesn't want to use catpars to grow NTs then step 4 can be eliminated in both of the preceding procedures.

Figure 8:
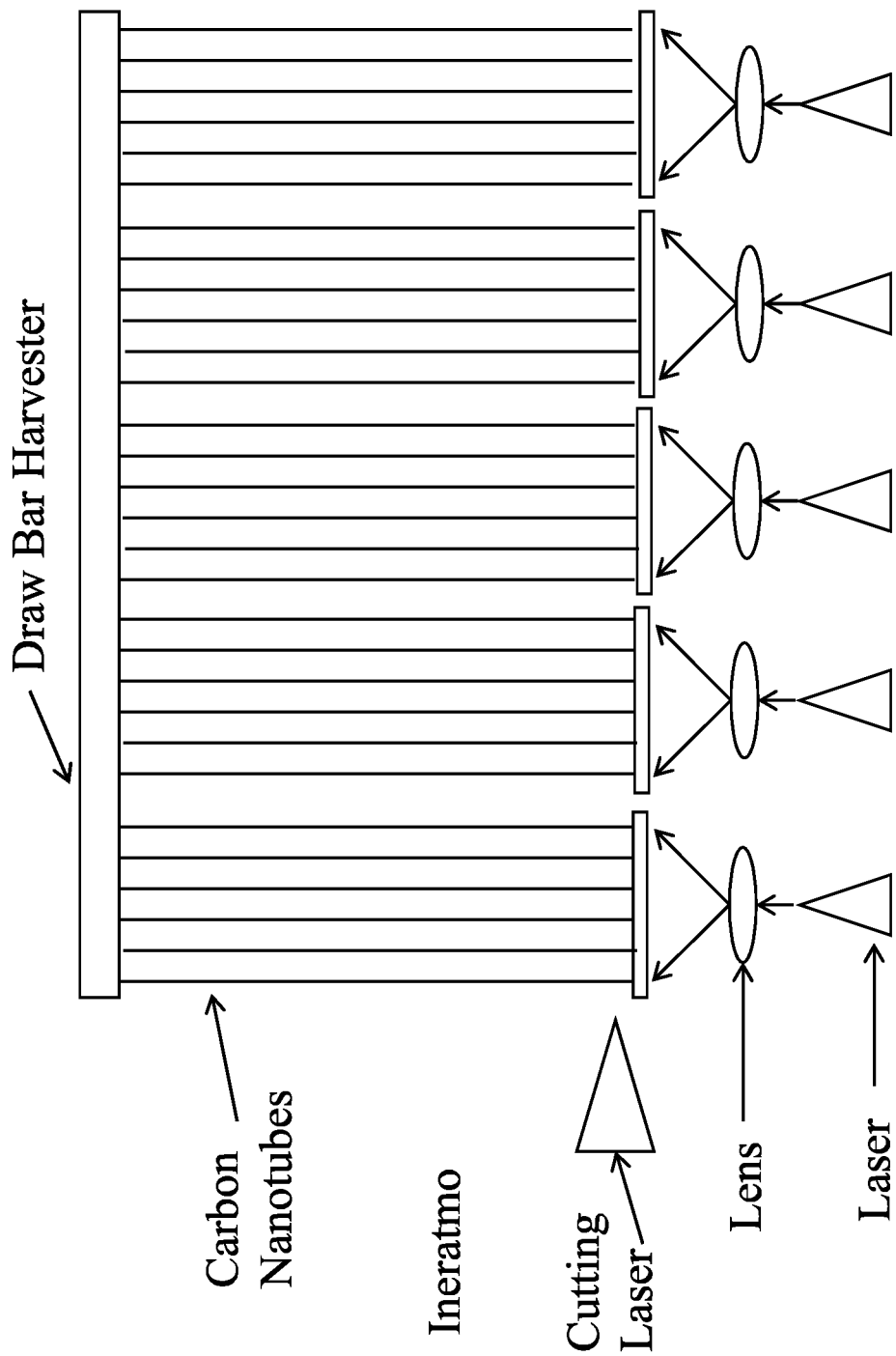
FIG. 8 illustrates schematically an industrial application embodiment of the present invention wherein a laser delivers energy to substrate assemblies that continuously grow CNTs.

The inventor envisions transforming the present invention into an industrial process in which a vast amounts of long, highq NTs are created. FIG. 8 illustrates schematically this vision. FIG. 8 shows the side view inside a reaction chamber. Five assemblies each consisting of a substrate with catpars arranged on it sitting above a laser. In between is a lens that transports the photons from the laser to the backside of the substrate. Above the front surface of the five substrates is a "draw bar harvester". When the NT growth has progressed for a time, the bar moves down, attaches to the growing NT surface and then rises in cadence with the growth. When the NTs are ready to be harvested, an industrial laser cuts the NTs off, above the substrate assembly level. The bar then transports the harvested NTs out of the reaction chamber to a processing location. Another bar moves in and acquires the tops of the growing NTs and the process continues.

FIG. 7 is an overhead view of another embodiment of an industrial process for the Free Atom Nanotube Growth Technology, in this case a broadtip system. The broadtip assembly, to which the articulated arm attaches, which in turn is attached to a motion stage moves the broadtip assembly in three dimensions. Additionally, to efficiently deposit vertical NTs, the broadtip assembly also rotates in two axes. Two raised platforms and a sloped surface on the drawing facilitate the vertical NT and NT bridge structure features. The varied forms of the patterns of NTs deposited on the surface illustrate the potential capabilities of this system as envisioned by the inventor.

Achieving industrial-scale manufacturing of long, highq NTs means that these materials will become increasingly plentiful and inexpensive. In the case of CNTs, with their remarkable tensile strength and electrical properties, new ways of building existing commodities will be developed and new products will be invented using the superior material properties. CNT high strength material, possibly exceeding in tensile strength all existing materials by an order of magnitude or more, will revolutionize life on Earth. Additionally, with patterned growth technology, CNT electrical components created at the nanometer scale lengths will enable smaller, lower power integrated circuits and will transform human society. The most extreme example of the benefits may be that high strength CNTs will enable the Space Elevator, thereby opening the resources of space to mankind in the form of enhanced Earth observation, space-based solar power, asteroid mining, planetary defense and colonization of the moons and planets of our solar system!

It will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A method, comprising:
    liberating feedatoms disposed over a front side of a substrate in response to electromagnetic radiation that propagates from the back side of the substrate, through the substrate, to the front side of the substrate; and
    forming, from the liberated feedatoms, at least one nanotube over the front side of the substrate in response to at least one catalyst separate from the substrate and disposed over the front side of the substrate and over the feedatoms.

2. The method of claim 1 wherein liberating the feedatoms includes causing the feedatoms to migrate to the at least one catalyst.

3. The method of claim 1 wherein the at least one catalyst includes a catalyst layer.

4. The method of claim 1 wherein the at least one catalyst includes at least one catpar.

5. The method of claim 1, further comprising liberating the feedatoms and forming the at least one nanotube while the substrate is exposed to an ineratmo.

6. The method of claim 1 wherein the feedatoms include atoms of amorphous carbon.

7. The method of claim 1 wherein the substrate includes a quartz substrate.

8. A method, comprising:
    disposing, over a front surface of a substrate, feedatoms configured to migrate in response to electromagnetic radiation that propagates from a back surface of the substrate, through the substrate, to the front surface of the substrate; and
    disposing, over the front surface of the substrate and over the feed atoms, at least one catalyst separate from the substrate and configured to allow migrating ones of the feedatoms to form at least one nanotube over the front surface of the substrate.

9. The method of claim 8 wherein disposing the feedatoms includes forming a feedlayer over the front surface of the substrate.

10. The method of claim 8 wherein disposing the feedatoms includes:
    forming a feedlayer over the front surface of the substrate;
    forming a mask over the feedlayer; and
    removing at least one portion of the feedlayer exposed by the mask.

11. The method of claim 8 wherein disposing the at least one catalyst includes forming a catalyst layer over the feedatoms.

12. The method of claim 8 wherein disposing the at least one catalyst includes forming a catpar over the feedatoms.

13. The method of claim 8 wherein disposing the feedatoms and disposing the at least one catalyst includes forming a layer that includes the feedatoms and the at least one catalyst.

14. The method of claim 8, further comprising forming, beneath the feedatoms, a source of the electromagnetic radiation.

15. The method of claim 8, further comprising forming, beneath the feedatoms, an amplifier coupled to the source of the electromagnetic radiation.

16. A method, comprising:
    liberating carbon feedatoms disposed over a front side of a quartz substrate in response to electromagnetic radiation; and
    forming, from the liberated carbon feedatoms, at least one nanotube over the front side of the substrate in response to at least one catalyst separate from the substrate and disposed over the front side of the substrate and over the carbon feedatoms.

17. The method of claim 16 wherein liberating carbon feedatoms includes liberating the carbon feedatoms in response to electromagnetic radiation incident toward the front side of the substrate.

18. The method of claim 16 wherein liberating carbon feedatoms includes liberating the carbon feedatoms in response to electromagnetic radiation incident toward the back side of the substrate.

* * * * *